United States Patent [19]
Kato et al.

[11] 3,940,332
[45] Feb. 24, 1976

[54] TREATING WASTE WATER CONTAINING NITRILES AND CYANIDES

[75] Inventors: Akinori Kato, Hiratsuka; Kenji Yamamura, Kamakura, both of Japan

[73] Assignee: Sumitomo Heavy Industries, Ltd., Tokyo, Japan

[22] Filed: Dec. 20, 1974

[21] Appl. No.: 534,794

[30] Foreign Application Priority Data

Sept. 6, 1974   Japan............................... 49-101910

[52] U.S. Cl. .................................... 210/2
[51] Int. Cl.² ............................................ C02C 5/10
[58] Field of Search .............. 195/2, 3 R; 210/2, 11

[56] References Cited
UNITED STATES PATENTS

| | | | |
|---|---|---|---|
| 3,152,983 | 10/1964 | Davis et al. | 210/11 |
| 3,660,278 | 5/1972 | Mimura et al. | 210/11 |
| 3,756,947 | 9/1973 | Fujii et al. | 210/11 |
| 3,779,866 | 12/1973 | Azarowicz | 195/2 |

*Primary Examiner*—Thomas G. Wyse
*Attorney, Agent, or Firm*—Armstrong, Nikaido & Wegner

[57] ABSTRACT

A waste water effluent containing nitriles and cyanides is treated by passing through an acclimated, activated sludge containing a microorganism capable of degrading nitriles and cyanides and being selected from the genus Nocardia, for example, *Nocardia rubropertincta* ATCC 21930 thereby to purify the waste water effluent. The waste water effluent containing 50 ppm to 250 ppm of nitriles and 10 to 50 ppm of cyanide and 500 to 2,000 ppm of COD (Potassium Dichromate Method) can be purified with a high efficiency.

3 Claims, No Drawings

TREATING WASTE WATER CONTAINING NITRILES AND CYANIDES

This invention relates to a process for treating waste water containing nitriles and cyanides, and more particularly to a process for treating industrial waste water containing nitriles such as acetonitrile, acrylonitrile, propionitrile and succinonitrile and cyanides such as sodium cyanide and potassium cyanide by an activated sludge containing microorganisms capable of degrading nitriles and cyanides.

Water pollution, that is, pollution of river, lake, sea, etc. by waste water effluents from various industries due to the development of industries has been recently a serious problem. To solve such a serious problem, various processes for treating the waste water have been proposed and practiced. Among these processes, a process based on activated sludge has been recently applied to the treatment of industrial waste water and has been found to attain a remarkable effect. However, waste water containing nitriles and cyanides, the sparingly degradable and toxic compounds, which are slow in degradation by microorganisms, for example, a waste water from the production of acrylonitrile, cannot be treated by the so-called ordinary activated sludge. For example, according to the experiences of the present inventors it is impossible in the case of strongly toxic waste water containing sparingly degradable compounds such as waste water effluents from the production of acrylonitrile to obtain an activated sludge capable of degrading nitriles and cyanides by acclimating the microorganisms to the activated sludge for 2 to 3 months even in a small laboratory-scale test, that is, by subjecting an activated sludge of sewage treatment plant as a seed to waste water containing nitriles and cyanides little by little under aerobic conditions and gradually acclimating the microorganisms to the sludge to obtain a new type of activated sludge.

An object of the present invention is to provide a process for effectively treating a waste water containing sparingly degradable and toxic nitriles and cyanides. That is to say, the object of the present invention is to provide a process for treating a waste water containing nitriles and cyanides characterized by adding to an activated sludge a microorganism capable of degrading nitriles and cyanides and being selected from the genus Nocardia, acclimating the microorganisms to the sludge and passing a waste water containing nitriles and cyanides through the activated sludge containing acclimated microorganisms thereby to purify the waste water.

According to the present invention, a microorganism capable of degrading nitriles and cyanides, and being selected from the genus Nocardia is, first of all, added to an activated sludge to acclimate the microorganism to the sludge. Examples of the microorganisms capable of degrading nitriles and cyanides and being selected from the genus Nocardia include *Nocardia rubropertincta* ATCC 21930 (FERM-P No. 2030), the strain having been isolated by the present inventors.

Diagnostic characteristics of the strain *Nocardia rubropertincta* ATCC 21930 (FERM-P No. 2030) are given in Table 1.

Table 1

| Diagnostic characteristics Strain | *Nocardia rubropertincta* ATCC 21930 |
|---|---|
| (a) Morphological characters | |
| (1) Shape and size of cells | small rod 1.5 × 1μ |
| (2) Presence of pleomorphic cells | Micelle → Rod |
| (3) Motility | None |
| (4) Flagella | None |
| (5) Spore formation | None |
| (6) Gram staining | (+) |
| (7) Acid fastness | None |
| (b) Growth on media | |
| (1) Bouillon agar plate culture: | |
| 2nd day from culturing: | punctiform, 1.7 – 1.5 mm in diameter, *cephodium*, entire, pink, glistening, turbidity, good growth |
| 4th day from culturing: | circular, 2.4 mm in diameter, *cephodium*, entire, pink, glistening, turbidity |
| (2) Bouillon agar slant culture: warty, pink glistening, good growth | |
| (3) Bouillon broth culture: good growth, slight turbidity, thin pellicle, sediment (pink), slight floc formation | |
| (4) Bouillon gelatin stab culture: | |
| 6th day from culturing: | no liquefaction |
| 14th day from culturing: | no liquefaction |
| (5) Litmus milk: | |
| 2nd day from culturing: | alkaline, no liquefaction |
| 4th day from culturing: | alkaline, no liquefaction |
| 12th day from culturing: | alkaline, no liquefaction |
| (c) Physiological characters | |
| (1) Nitrate reduction | (+++) |
| (2) Denitration | (−) |
| (3) MR test | (−) |
| (4) VP test | (+) |
| (5) Indole formation | (−) |
| (6) Hydrogen sulfide formation | (+++) |
| (7) Starch hydrolyzation | (−) |
| (8) Citrate utilization | |
| Koser's medium | (−) |
| Christensen's medium | (+++) |
| (9) Inorganic nitrogen source utilization | |
| $(NH_4)_2SO_4$ | (+++) |
| $NaNO_3$ | (+++) |
| (10) Pigment formation | insoluble (pink) |
| (11) Urease | (−) |
| (12) Oxidase | (−) |
| (13) Catalase | (++) |
| (14) $NH_4$ formation | (++) |
| (15) Optimum pH for growth | 6.0 – 11.0 |
| Optimum temperature for growth | 20° – 45°C |
| (16) Growth condition | aerobic |
| (17) O-F test Hugh and Leifson test | no acid formation (−) |
| (18) Utilization of saccharides and gas formation | |

| | Utilization of saccharides | Gas formation |
|---|---|---|
| L-arabinose | (−) | (−) |
| D-xylose | (−) | (−) |
| D-glucose | (+) | (−) |
| D-mannose | (+) | (−) |
| D-fructose | (+) | (−) |
| D-glactose | (−) | (−) |
| Maltose | (+) | (−) |
| Sucrose | (+) | (−) |
| Lactose | (−) | (−) |
| Trehalose | (+) | (−) |
| D-sorbitol | (+) | (−) |
| D-mannitol | (+) | (−) |
| Inositol | (−) | (−) |
| Glycerin | (−) | (−) |
| Starch | (−) | (−) |

| (d) Other characters: | |
|---|---|
| (1) Cyanide degradation: | (+) |
| (2) Nitrile degradation: | |
| Acrylonitrile | (+) |
| Acetonitrile | (+) |
| Propionitrile | (+) |
| Butyronitrile | (+) |
| Crotononitrile | (+) |

Table 1-continued

| Strain | Diagnostic characteristics<br>Nocardia rubropertincta<br>ATCC 21930 |
|---|---|
| Fumaronitrile | (+) |
| Valeronitrile | (+) |
| Glutaronitrile | (+) |
| Benzonitrile | (+) |
| (3) Isolation source: | activated sludge |

Note.
In the above Table the terms shown having the following meanings assigned thereto:
(1) (−) negative
(2) (+) positive
(3) (++) very positive
(4) (+++) most positive The strain Nocardia rubropertincta ATCC 21930 (FERM-P No. 2030) was identified to belong to the genus Nocardia in view of the foregoing diagnostic characteristic according to "Bergey's Manual of Determinative Bacteriology", 7th edition. The strain Nocardia rubropertincta was almost identical in the properties with the species Nocardia rubropertincta. The strain had an ability to degrade nitriles and cyanides which is not described in said Bergey's Manual. However, the strain was thus named as Nocardia rubropertincta and deposited in Biseibutsu Kogyo Gizyutsu Kenkyuzyo (Fermentation Research Institute) of Kogyo Gizyutsuin (Industrial Science and Technology Agency), Japan, under a register number of FERM-P No. 2030 and in American Type Culture Collection, 12301 Parklawn Drive, Rockville, Maryland, USA, under a register number of ATCC 21930.

The strain is a mere example of the microorganisms used in the present invention, and any microorganism belonging to the genus Nocardia can be used, so long as it is capable of degrading nitriles and cyanides and propagating on an activated sludge.

When a microorganism selected from the genus Nocardia is used, two or more microorganisms belonging to the genus Nocardia can be used.

In adding the microorganism capable of degrading nitriles and cyanides and being selected from the genus Nocardia to an activated sludge, a pure culture of the microorganism is usually added thereto. The pure culture can be carried out according to the ordinary procedure for pure culture of microorganism. For example, a liquid culture medium containing a carbon source including organic acids and nitrile compounds, nitrogen source including inorganic nitrogen compounds such as urea, ammonium sulfate, etc. and organic nitrogen compounds such as corn-steep liquor (CSL), inorganic salts such as calcium phosphate and a compound fertilizer such as potassium ammonium phosphate, and other nutrients such as peptone, blackstrap molasses, etc. if necessary, which is suitable for the growth of said microorganism, is placed in a culture tank and sterilized. Then, the culture medium is adjusted to a temperature suitable for the growth of the microorganism, and inoculated with cells of said microorganism separately grown and prepared on an agar slant. Then, sterilized air is blown into the tank and the medium is stirred with a stirrer to bring the medium under aerobic growth conditions. Cells of said microorganism are propagated. At that time, the pH and temperature of the culture medium are kept suitable for the growth of said microorganism. In this manner, a large amount of pure culture of the desired microorganism can be obtained. In carrying out the pure culture of said microorganism, a good result can be obtained when pure culture of said microorganisms is carried out in a medium containing 0.001 to 0.005 W/V % of cyanides and 0.005 to 0.025 W/V % of nitriles.

Cultures of said microorganism obtained in a large amount by the pure culture as mentioned above, or cells obtained from the cultures, are added to an activated sludge. The ordinary activated sludge, for example, activated sludge of sewage treatment plant, can be used as the activated sludge of the present invention.

The pure cultures or cells of said microorganism are added to the activated sludge in the ordinary aeration tank. It is preferable to add the pure cultures thereto in a volume of approximately or more than one-tenth, based on the volume of aeration tank, or add cells corresponding to the volume of pure cultures.

In adding the pure culture of said microorganism to the activated sludge, the pure culture can be directly added and acclimated to the activated sludge, if the microorganism has a good coagulability. If the microorganism has no coagulability when added to the activated sludge, a suitable coagulant, for example, ferric chloride, ferrous sulfate, calcium salt, organic polyelectrolyte, etc. is used to coagulate cells, and the coagulated cells are added, acclimated and propagated to the activated sludge. In this manner, an activated sludge applicable to a waste water effluent containing sparingly degradable substances such as a waste water effluent containing nitriles and cyanides can be prepared in a very short period of time. The waste water is then passed through the activated sludge containing the thus acclimated microorganism and purified according to the ordinary means and operational procedures as in the conventional activated sludge process. For example, a waste water containing nitriles and cyanides can be treated by passing the waste water containing nitriles and cyanides at a proper concentration, for example, a waste water having 10 to 50 ppm of CN and 500 to 2,000 ppm of COD (Potassium Dichromate Method) continuously through the activated sludge while keeping optimum conditions for decreasing BOD [optimum BOD loading such as 0.8 to 1.5 kg BOD/m$^3$.d, optimum oxygen supply such as 0.2 to 2.0 ppm in DO (Dissolved Oxygen), optimum pH such as 7.0 to 8.5, and optimum temperature such as 20° to 30°C, with a supply of nutrients, etc., if necessary] and biologically degrading organic matters contained therein, as in the ordinary activated sludge process for obtaining the desired purified water.

Therefore, in carrying out the present invention, no other complicated apparatus than a simple facility for carrying out pure culture of said microorganism in a large amount is necessary for the conventional waste water treatment facility based on the activated sludge.

Now, the present invention will be explained in detail, referring to example.

EXAMPLE

Nocardia rubropertincta ATCC 21930 (FERM-P No. 2030), strain capable of degrading nitriles and cyanides and being acclimated to activated sludge, which belonged to the genus Nocardia, was seed-cultured in 0.1 l of sterilized medium of glucose nutrient broth containing 500 ppm of acrylonitrile and 25 ppm of sodium cyanide at 30°C for 2 to 3 days, and the seed culture was further cultured in 1 l of sterilized medium having the same composition as above, whereby pure culture was obtained in large amount.

A coagulant was added to 1 l of the thus obtained pure culture when required, and the pure culture of said microorganism was added rapidly to an activated sludge of sewage treatment, and acclimated and propagated on the sludge for about 1 week to obtain a new type of activated sludge. Waste water effluent containing nitriles and cyanides was passed through the thus obtained activated sludge under loads as shown in Table 2, and good results were obtained as shown in Table 2.

Table 2

| Test Run No. | 1 | 2 | 3 | 4 |
| --- | --- | --- | --- | --- |
| Loading | | | | |
| Retention time (hour) | 14 | 7 | 24 | 17 |
| COD$^1$ loading (kg/m$^3$/day) | 1.22 | 2.48 | 1.56 | 2.20 |
| BOD loading (kg/m$^3$/day) | 0.77 | 1.61 | 0.94 | 1.28 |
| BOD-MLSS (Mixed Liquor Suspended Solid) loading (kg/kg MLSS/day) | 0.15 | 0.32 | 0.19 | 0.26 |
| Influent | | | | |
| pH | 7.1 | 6.9 | 7.3 | 7.1 |
| COD$^1$ (ppm) | 718 | 709 | 1560 | 1570 |
| BOD (ppm) | 452 | 461 | 935 | 912 |
| CN$^{-2}$ (ppm) | 23.1 | 22.8 | 45.0 | 47.1 |
| Acrylonitrile$^3$ (ppm) | 106 | 113 | 224 | 212 |
| Effluent | | | | |
| pH | 8.1 | 8.4 | 7.9 | 8.2 |
| COD$^1$ (ppm) | 172 | 155 | 404 | 451 |
| BOD (ppm) | 19.4 | 10.7 | 61.2 | 77.4 |
| CN$^{-2}$ (ppm) | 0.14 | 0.07 | 0.31 | 0.24 |
| Acrylonitrile$^3$ (ppm) | <20 | <20 | <20 | <20 |
| Efficiency | | | | |
| COD (%) | 76 | 78 | 74 | 71 |
| BOD (%) | 96 | 98 | 93 | 95 |
| CN$^-$ (%) | 99.4 | 99.7 | 99.3 | 99.5 |
| Acrylonitrile | >80 | >80 | >90 | >90 |

Note:
1. COD is determined by Potassium Dichromate method JIS K 0102 (1971), pages 29 – 30
2. CN$^-$ is determined by Pyridine Pyrozolone method [JIS K0102 (1971), pages 93 – 95, No. 29.2, pyridine pyrazolone; American Standard Methods, 13th edition (1971), 207C, pages 404 – 406].
3. Acrylonitrile is determined by gas chromatography.

When the same waste water effluent was treated with the ordinary activated sludge of sewage treatment under the same conditions, the waste water could not be treated at all even if the influent was considerably diluted. To obtain similar results as shown in Table 2 with the ordinary activated sludge method, even in a small laboratory scale test, it was necessary to acclimate the ordinary activated sludge for 3 to 6 months.

According to the present invention, waste water effluent containing nitriles and cyanides, which has been deemed heretofore difficult to treat, can be purified very efficiently, and even in a newly-built factory, it is possible to treat the waste water rapidly with an acclimated activated sludge prepared by carrying out pure culture of microorganism capable of degrading nitriles and cyanides selected from the genus Nocardia, adding the pure culture or cells thereof to an activated sludge and acclimating and propagating the same on the activated sludge according to the present invention.

What is claimed is:
1. A process for the microbiological degradation of nitriles and cyanides contained in a waste water effluent which comprises
   i. adding at least one microorganism capable of degrading nitriles and cyanides to an aqueous sludge, said microorganism being the strain *Nocardia rubropertincta*, ATCC 21930;
   ii. acclimating said microorganism to said activated sludge; and
   iii. passing a waste water effluent containing nitriles and cyanides through the thus acclimated sludge whereby the microbiological disintegration of the nitriles and cyanides is accomplished, thus purifying the waste water effluent.

2. A process according to claim 1, wherein the microorganism is a pure culture or cells obtained by culturing the microorganism in a culture medium aerobically.

3. A process according to claim 1, wherein the culture medium contains 0.005 to 0.025 W/V % of nitriles and 0.001 to 0.005 W/V % of cyanides.

* * * * *